United States Patent [19]

Hornyack et al.

[11] Patent Number: 5,732,740
[45] Date of Patent: Mar. 31, 1998

[54] SMART ACCUMULATOR TO ATTENUATE PULSES IN A HYDRAULIC ELEVATOR

[75] Inventors: John Hornyack, Tolland; William A. Wurts, Wethersfield, both of Conn.

[73] Assignee: Otis Elevator Company, Farmington, Conn.

[21] Appl. No.: 442,517

[22] Filed: May 16, 1995

[51] Int. Cl.$^6$ .................................................. F16L 55/04
[52] U.S. Cl. ...................... 138/26; 138/30; 188/267; 267/140.15
[58] Field of Search .................................. 138/30, 31, 26, 138/45; 188/267; 137/827; 267/140.15, 140.14; 220/720, 721

[56] References Cited

U.S. PATENT DOCUMENTS

| | | | |
|---|---|---|---|
| 4,195,668 | 4/1980 | Lewis | 138/30 |
| 4,720,087 | 1/1988 | Duclos et al. | 267/140.14 |
| 4,750,523 | 6/1988 | Crouse | 138/30 |
| 4,869,476 | 9/1989 | Shtarkman | 207/140.1 |
| 4,880,216 | 11/1989 | Hartel et al. | 267/140.14 |
| 4,919,402 | 4/1990 | Doi | 267/140.14 |
| 4,973,031 | 11/1990 | Takano et al. | 188/267 X |
| 5,018,606 | 5/1991 | Carlson | 188/267 |
| 5,038,894 | 8/1991 | Watanabe | 187/17 |
| 5,099,884 | 3/1992 | Monahan | 137/827 X |
| 5,267,633 | 12/1993 | Endo et al. | 188/267 |
| 5,269,811 | 12/1993 | Hayes et al. | 623/3 |
| 5,316,112 | 5/1994 | Kimura et al. | 188/267 |
| 5,316,261 | 5/1994 | Stoner | 138/45 X |
| 5,417,314 | 5/1995 | Sproston et al. | 188/267 |

*Primary Examiner*—Patrick F. Brinson

[57] ABSTRACT

A body of electrorheological ("Smart") fluid is disposed between hydraulic fluid within a hydraulic elevator system, and a chamber filled with pressure absorbing fluid. By introducing a field within the Smart fluid to maintain the Smart fluid in a given phase, the Smart fluid transmits the pulsations from the hydraulic fluid to the pressure absorbing fluid as a function of the pulsations.

9 Claims, 1 Drawing Sheet

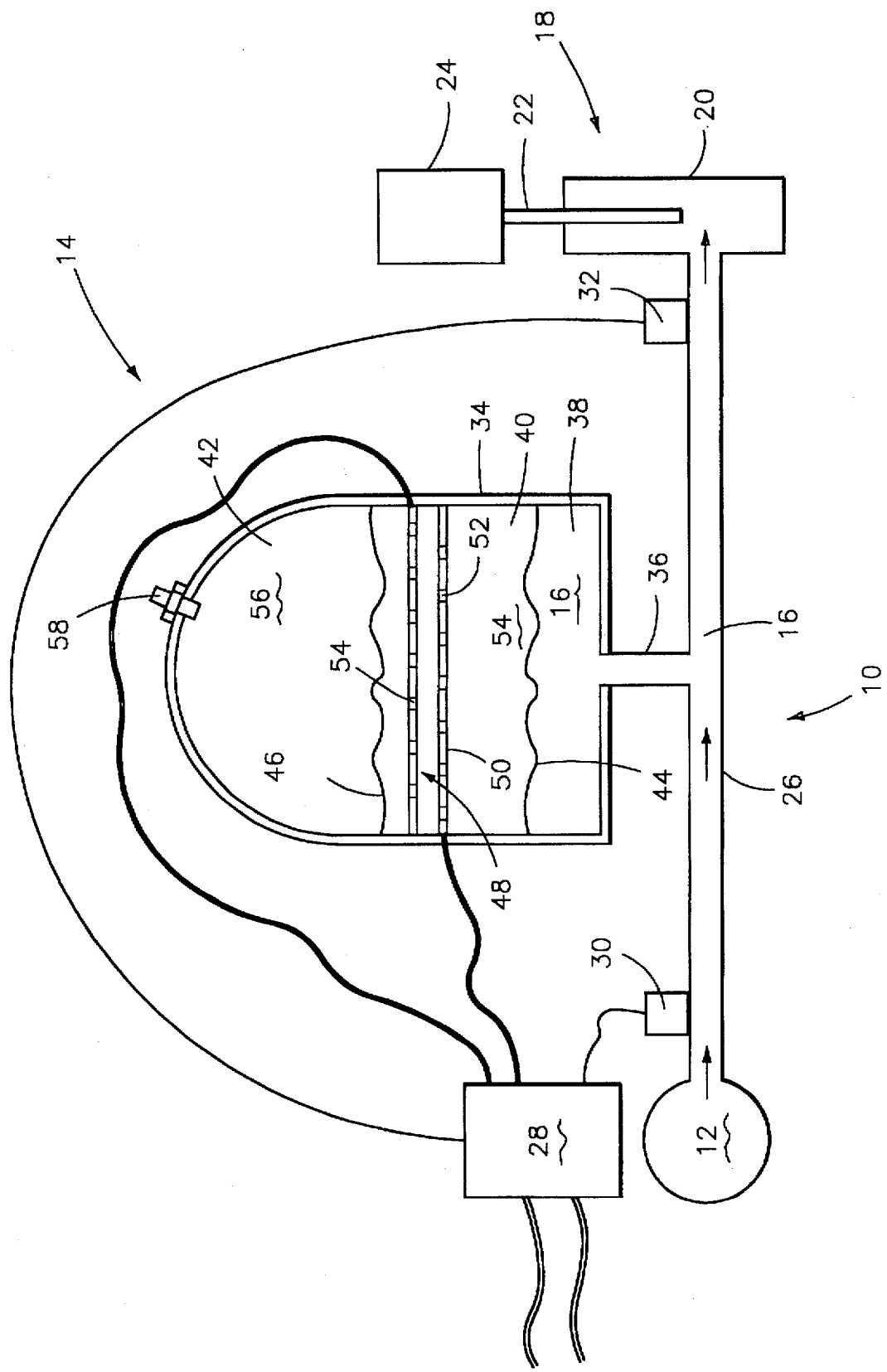

5,732,740

SMART ACCUMULATOR TO ATTENUATE PULSES IN A HYDRAULIC ELEVATOR

TECHNICAL FIELD

This invention relates to hydraulic elevators, and more particularly, to an accumulator for damping pulsations in elevator hydraulic fluid.

BACKGROUND ART

An hydraulic elevator is lifted upwardly and downwardly by a piston disposed within a cylinder. A pump propels hydraulic fluid to and from the cylinder to drive the piston upwardly and downwardly. The pump is typically powered by an electric motor.

Pumps do not run perfectly, however, and may impart pulsations (perturbations in the discharge pressure) into the hydraulic fluid. The pulsations may manifest themselves as noise and vibration which may be transmitted to an elevator cab causing noise and vibration therein. The pulsations may also stimulate resonant modes of vibrations in adjoining machinery thereby causing additional vibration and noise in the elevator cab. Such noise and vibration is clearly undesirable.

Many methods, such as baffles, mufflers, and spring back bladders have been used to attenuate these pulsations. Such methods have drawbacks such as high cost, high pressure drops or poor effectiveness. A new apparatus for attenuating pulsations in hydraulic fluid used in hydraulic elevators, and other systems, is required.

DISCLOSURE OF THE INVENTION

It is an object of the invention to damp the effect of pulsations in the flow of hydraulic fluid in an hydraulic elevator.

It is a further object of the invention to damp the pulsations in view of changing system loads and pressures.

It is a further object of the invention to provide a damping system which could be easily installed in an hydraulic elevator and not degrade the performance of the remainder of this system.

According to the invention, a body of electrorheological ("Smart") fluid is disposed between hydraulic fluid within a hydraulic elevator system, and a chamber filled with pressure absorbing fluid. By introducing a field within the Smart fluid to maintain the Smart fluid in a given phase, the Smart fluid transmits the pulsations from the hydraulic fluid to the pressure absorbing fluid as a function of the pulsations.

According to a feature of the invention, electrodes for inducing an electrical field within the Smart fluid have a shape conforming to the shape of the body of Smart fluid (i.e., circular) and have a plurality of holes therein which minimally restrict the flow of the Smart fluid when in a liquid state.

The foregoing and other objects, features and advantages of the present invention will become more apparent in light of the following detailed description and accompanying drawings.

BRIEF DESCRIPTION OF THE DRAWINGS

The FIGURE is a perspective view, partially in section and partially schematic, of an embodiment of hydraulic elevator accumulator of the invention.

BEST MODE FOR CARRYING OUT THE INVENTION

Referring to the FIGURE, an hydraulic elevator system 10 is shown. The system comprises a conventional motor and pump (shown schematically at 12), an accumulator system 14 for attenuating the pulsations within pressurized hydraulic fluid 16 used within the system, and an hydraulic elevator 18. The hydraulic elevator includes cylinder 20, a piston 22 and a cab 24. Hydraulic fluid 16 is directed from the pump to the cylinder, as is known in the art, via line 26.

The accumulator system 14 includes a controller 28, an upstream conventional pressure sensor 30 (such as a transducer), a downstream conventional pressure sensor 32 (such as a transducer), and an attenuating vessel ("vessel") 34 disposed between the upstream and downstream sensors. The controller 28 receives signals from the upstream and downstream sensors 30, 32 which are proportional to the amplitude and frequency of pulsations in the hydraulic fluid 16. Inlet line 36 connects the vessel to line 26 between the pump 12 and the cylinder 20 and between the upstream and downstream sensors.

The vessel 34, which is able to contain the operating pressures of hydraulic system 10, is divided into a lower portion 38, a mid-portion 40 and an upper portion 42. The lower portion and the mid-portion are separated by a lower conventional flexible bladder 44. The mid-portion and the upper portion are separated by an upper conventional flexible bladder 46. The upper and lower bladders are attached to the vessel by conventional means. Hydraulic fluid flows from line 26 through access line 36 into the lower portion 38.

Disposed within the mid-portion 40 are an upper flat circular electrode 48 and a lower flat circular electrode 50. The electrode shape conforms generally to the interior shape (and the body of Smart fluid thereby) of the vessel to create a uniform field within the mid-portion thereof. Each electrode has a plurality of holes 52 passing therethrough as will be discussed infra. Each electrode is electrically isolated from the walls of the vessel as is known in the art to prevent short circuiting. The mid-portion is filled with an electrorheological ("Smart") fluid 54 as is known in the art.

Smart fluids are typically suspensions of fine particles in a nonconducting oil. Smart fluids are unique because they can change viscosity from a fluid to a gel-like solid in 0.0001 to 0.001 seconds when subjected to an electric field. Since the degree of gelling is proportional to the applied field strength, varying the voltage allows the fluid to smoothly change from liquid state to solid state and back again. An electrorheological fluid which is operable to carry out the objects of this invention is marketed commercially by Advanced Fluid Systems, Ltd., London, England (AVS), and which is identified by AVS as their "general purpose ER fluid". This ER fluid is polymer-based and comprises a lithium polymethacrylate component suspended in a chlorinated paraffin component. This ER fluid is suitable for use in an environment which experiences the dynamics of an hydraulic elevator.

A fluid 56, such as pressurized air or a pressurized inert gas, as is known in the art, is disposed in the upper portion 42 of the vessel 34 to attenuate pressure pulsations transferred thereto as is known in the art. A valve 58 is disposed at the top of the vessel so that the fluid 56 in the upper portion may be recharged as is necessary.

During operation, if the upstream sensor 30 senses no or minimal pressure perturbation in the hydraulic fluid, the controller 28 responds by sending sufficient voltage to the electrodes 48, 50 to maintain the Smart fluid in its solid state. As a result, the hydraulic fluid in the lower portion pressurizes only the lower bladder 44 and not the fluid 56 in the upper portion 42. If the upstream sensor senses pressure perturbations in the hydraulic fluid, the controller proportionally decreases the voltage to the electrodes so that the Smart fluid changes phase proportionately in a range from solid to liquid. The Smart fluid transmits pulsations form the hydraulic fluid to the compressible fluid where they are attenuated.

The holes 52 in the circular electrodes 48, 50 provide minimally restricted flow of the Smart fluid when it is in the liquid state. However, when the electric field is applied, the fluid between the plates gels or solidifies and, in combination with flow limiting holes, limits transference of pressure perturbations in the hydraulic fluid 16 to the pressure absorbing fluid in the upper portion as required.

The downstream sensor 32 provides feedback as to how well the accumulator system 14 is attenuating pressure pulsations. Signals from the downstream sensor are input to the controller 28 and together with the input from the upstream sensor 30, the optimal voltage between the electrodes is generated. The downstream sensor provides closed loop control for the accumulator system, as one of ordinary skill in the art can readily appreciate.

Because the Smart fluid changes phase so quickly, a wide range of frequency perturbations or pulsations are sensed, reacted to, and damped by the accumulator system.

Because the upstream and downstream sensors may be readily adapted to monitor existing hydraulic flow in line 26, and because the vessel inlet 36 is easily attached to line 26, the accumulator system 14 readily retrofits existing hydraulic elevators and other systems.

Although the invention has been shown and described with respect to a best mode embodiment thereof, it should be understood by those skilled in the art that various other changes, omissions and additions in the form and detail thereof may be made therein without departing from the spirit and scope of the invention. Specifically, one of ordinary skill in the art will recognize that the fluid in the upper portion may be replaced by another controlled Smart fluid to react sufficiently to dampen the undesirable pressure perturbations. Further, to provide design flexibility due to different system parameters, hole patterns, the proximity of the two plates to each other, and separate electrodes separate from the holed plates may be used.

We claim:

1. An assembly for a hydraulic elevator for attenuating pulsations occurring in a hydraulic fluid line, said assembly comprising:

a) means providing a body of pressure-absorbing fluid;

b) means providing a body of electrorheological fluid between and separating said hydraulic fluid line from said body of pressure-absorbing fluid;

c) electrode means within said body of electrorheological fluid for creating an electrical field therein which can bring about a viscosity change in said electrorheological fluid;

d) first pressure sensor means for sensing hydraulic fluid pulsations in said hydraulic fluid line, said first means being operable to generate first signals proportional to the magnitude of any sensed pulsations; and e) controller means operably connected to said first pressure sensor means, and to said electrode means, said controller means being operable to output a voltage to said electrode means that will create an electrical field which will induce a viscosity in said electrorheological fluid, which viscosity will selectively transmit hydraulic fluid pulsations to said body of pressure-absorbing fluid to selectively attenuate such hydraulic fluid pulsations.

2. The assembly of claim 1 wherein said electrode means comprises a pair of electrodes, each electrode having a shape conforming to the shape of the body of electrorheological fluid so that a uniform field may be created in said body of electrorheological fluid, each electrode being separated by a gap from the other electrode.

3. The assembly of claim 2 wherein said electrodes comprise a plurality of openings therein to allow the free flow of electrorheological fluid therethrough when said electrorheological fluid is in its low viscosity phase.

4. The assembly of claim 1 further comprising second pressure sensor means for providing second signals proportional to attenuated pulsations in said hydraulic fluid; and said controller being operable to receive said second signals and output a voltage to said electrodes in response to said second signals to control the viscosity of said electrorheological fluid to further minimize attenuated pulsations in said hydraulic fluid.

5. A method for attenuating unwanted hydraulic fluid pulsations occurring in a flowing stream of hydraulic fluid, said method comprising the steps of:

a) providing a body of electrorheological fluid adjacent to said flowing stream of hydraulic fluid;

b) transmitting upstream hydraulic fluid pulsations from said flowing stream to said body of electrorheological fluid;

c) sensing the magnitude of upstream hydraulic fluid pulsations transmitted to said body of electrorheological fluid;

d) providing a body of a pressure-absorbing fluid adjacent to said body of electrorheological fluid, on a side thereof opposite to said flowing stream of hydraulic fluid; and e) electrically altering the viscosity of said electrorheological fluid in response to the sensed magnitude of said upstream hydraulic fluid pulsations so as to selectively transmit pulsations from said hydraulic fluid stream to said pressure-absorbing fluid through said electrorheological fluid.

6. The method of claim 5 wherein said step of electrically altering is achieved by creating a variable electrical field in said electrorheological fluid, which field determines the viscosity of said electrorheological fluid.

7. The method of claim 5 further comprising the step of sensing the magnitude of attenuated downstream hydraulic fluid pulsations in order to determine the degree of pulsation attenuation.

8. The method of claim 7 comprising the step of further selectively altering the variable electrical field in response to the magnitude of the sensed downstream hydraulic fluid pulsations.

9. The method of claim 5 further comprising the step of restricting flow of said electrorheological fluid between said flowing stream of hydraulic fluid, and said body of pressure-absorbing fluid.

* * * * *